United States Patent [19]
Ballen et al.

[11] Patent Number: 5,960,741
[45] Date of Patent: Oct. 5, 1999

[54] ANIMAL CANTEEN AND DISH

[76] Inventors: Melvin Ballen, 15995 Terry Dr., Sky Valley, Calif. 92241; Sheldon E. Miller, 10448 Kinnard Ave., Los Angeles, Calif. 90024

[21] Appl. No.: 09/035,886

[22] Filed: Mar. 6, 1998

[51] Int. Cl.[6] .............................. A01K 39/02; A01K 7/00
[52] U.S. Cl. .......................................... 119/72; 119/51.01
[58] Field of Search .................................... 206/547, 217; 119/72, 51.5

[56] References Cited

U.S. PATENT DOCUMENTS

| D. 233,895 | 12/1974 | Mineo | D30/132 |
|---|---|---|---|
| D. 273,247 | 4/1984 | Pigott | D3/229 |
| D. 296,371 | 6/1988 | Lorenzana | D30/122 |
| 555,882 | 3/1896 | Preston | 206/546 |
| 1,373,155 | 3/1921 | Tebbetts | 206/217 |
| 1,373,156 | 3/1921 | Tebbetts | 206/546 |
| 3,072,285 | 1/1963 | Aileo | 220/326 |
| 3,112,733 | 12/1963 | Arnott | 119/77 |
| 4,192,256 | 3/1980 | Clugston | 119/51.5 |
| 4,450,966 | 5/1984 | Villavicencio, Jr. et al. | 206/547 |
| 4,899,693 | 2/1990 | Arnold | 119/28.5 |
| 4,946,413 | 8/1990 | Lehmann et al. | 446/28 |
| 5,056,424 | 10/1991 | Lai | 99/339 |
| 5,105,768 | 4/1992 | Johnson | 119/61 |
| 5,488,927 | 2/1996 | Lorenzana | 119/51.5 |
| 5,666,875 | 9/1997 | Wener | 99/422 |

Primary Examiner—Michael J. Carone
Assistant Examiner—Son T. Nguyen

[57] ABSTRACT

A compact and hands-free portable animal watering or watering and feeding utensil, with all of its elements easily combined in a single unit which is easily separated for use. It includes a container (20) which holds water and utilizes a screw-on cap (22), and a removable and replaceable receptacle (21). The container and receptacle (20 and 21) are made so as to come apart and snap together by use of arms with projections (23), which form a part of the receptacle (21), and which fit into depressions with sockets (24) in the container (20). The combined unit also has a belt clip (26) for hands-free transportation. The unit also includes a portable bridge type bracket (28) which fits into the receptacle (28). The bracket (28) can be threaded to the container (20) and then inverted and attached (30 and 31) to the receptacle (21); the container (20) will put water in the receptacle (21) up to the level of the mouth 33 of the inverted container (20) as the water in the receptacle (21) is consumed.

1 Claim, 6 Drawing Sheets

ANIMAL CANTEEN AND DISH

BACKGROUND

1. Field of Invention

The invention relates to an animal watering device, which combines into one very portable unit (a) a canteen-like container holding water and (b) a receptacle. Pets accompanying their owners on outdoor activities, such as jogging, bicycling, back packing or hiking, often require water or food and water during the activity.

2. Description of Prior Art

Animals often require nourishment while engaged in activities away from home. Supplying that nourishment, principally water, has led to prior attempts which focus on various elements of the problem without dealing with all of the elements. Allowing the owner a comfortable and compact and hands-free method of transporting the water during outdoor activities and providing a simple yet expedient method of serving the animal is necessary both to fulfill needs of the pet and the needs of the pet owner.

Several attempts have been made to provide spill resistant containers for pet watering. These containers, even if effective in resisting spills, are not portable. U.S. Pat. No. 4,436,054 to MacLeod shows a device which has no carrying straps and which loses its spill resistant qualities which in any position but upright. U.S. Pat. No. 4,192,256 to Clugston, is not portable except that it may be carried in a car. Carrying this bulky device with no straps would be uncomfortable for the animal's owner. U.S. Pat. No. 5,105,768 to Johnson shows a device which cannot be securely attached to the owner to avoid discomfort and pain while jogging or involved in other outdoor activities.

Other devices which incorporate portability do not meet the needs of the pet. U.S. Pat. Nos. 558,882, 1,373,155 and 5,056,424 are each designed for human, not pet, use. None of the prior art reflects fasteners which smoothly conform to the external configuration of the secured and combined container and dish. See U.S. Pat. Nos. 2,428,988, 4,795,048 and 5,666,875.

REFERENCE NUMBERS IN DRAWINGS

Figure 1:
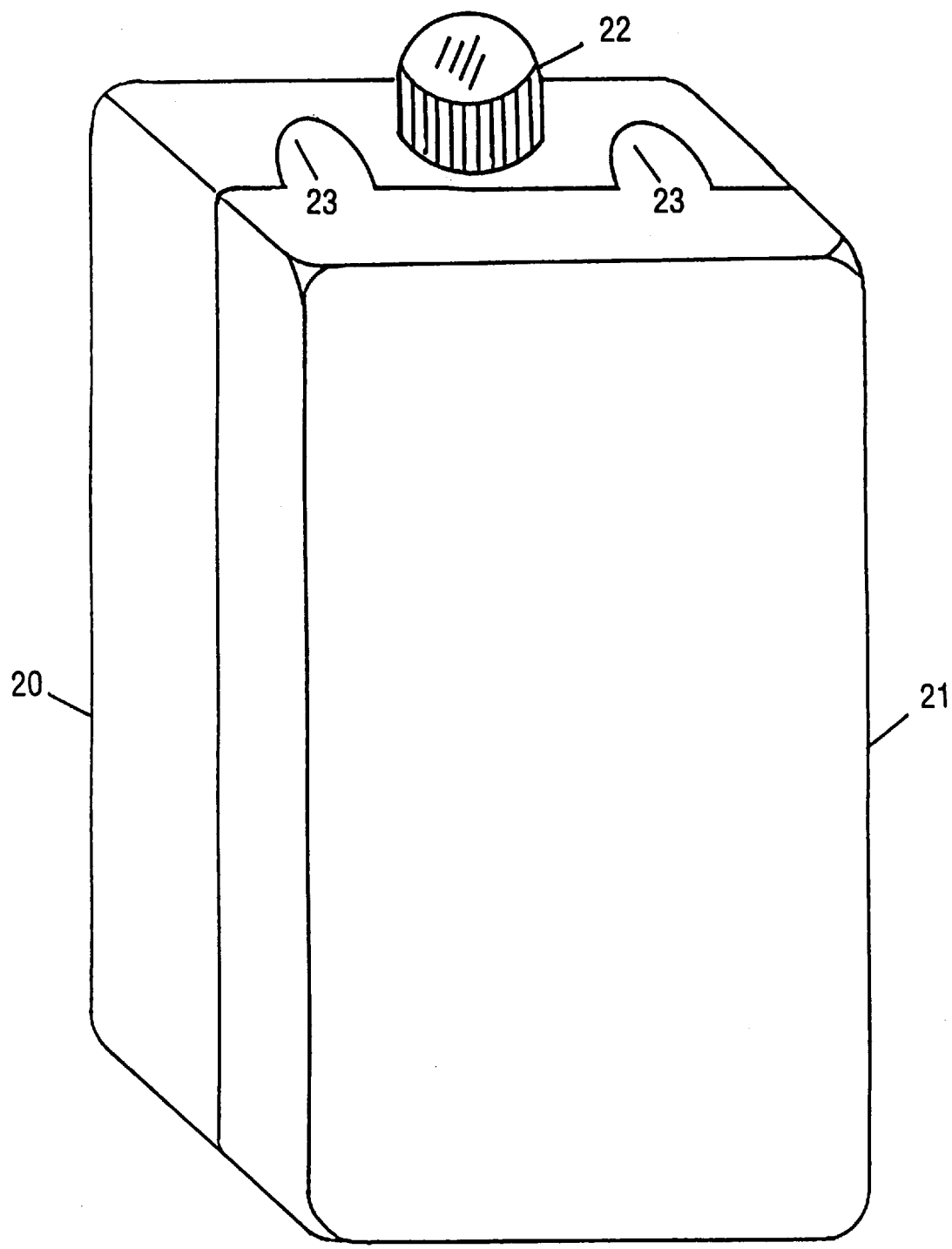
FIG. 1 shows the container, with cap, and the receptacle combined in a single unit.
Figure 2:
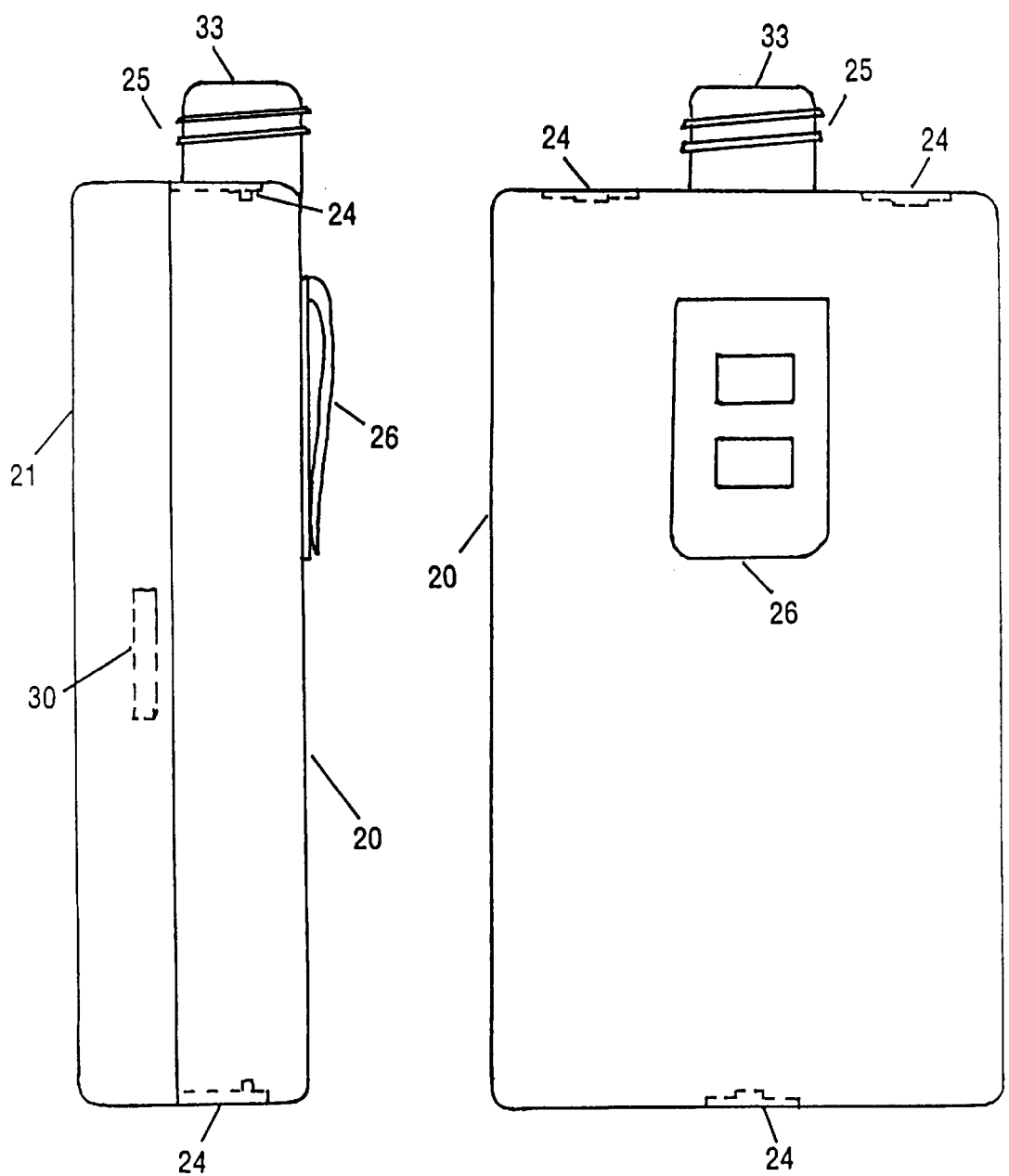
FIG. 2 shows the unit without the cap, showing the container with its threaded neck opening and its belt clip, and showing the receptacle.
Figure 3:
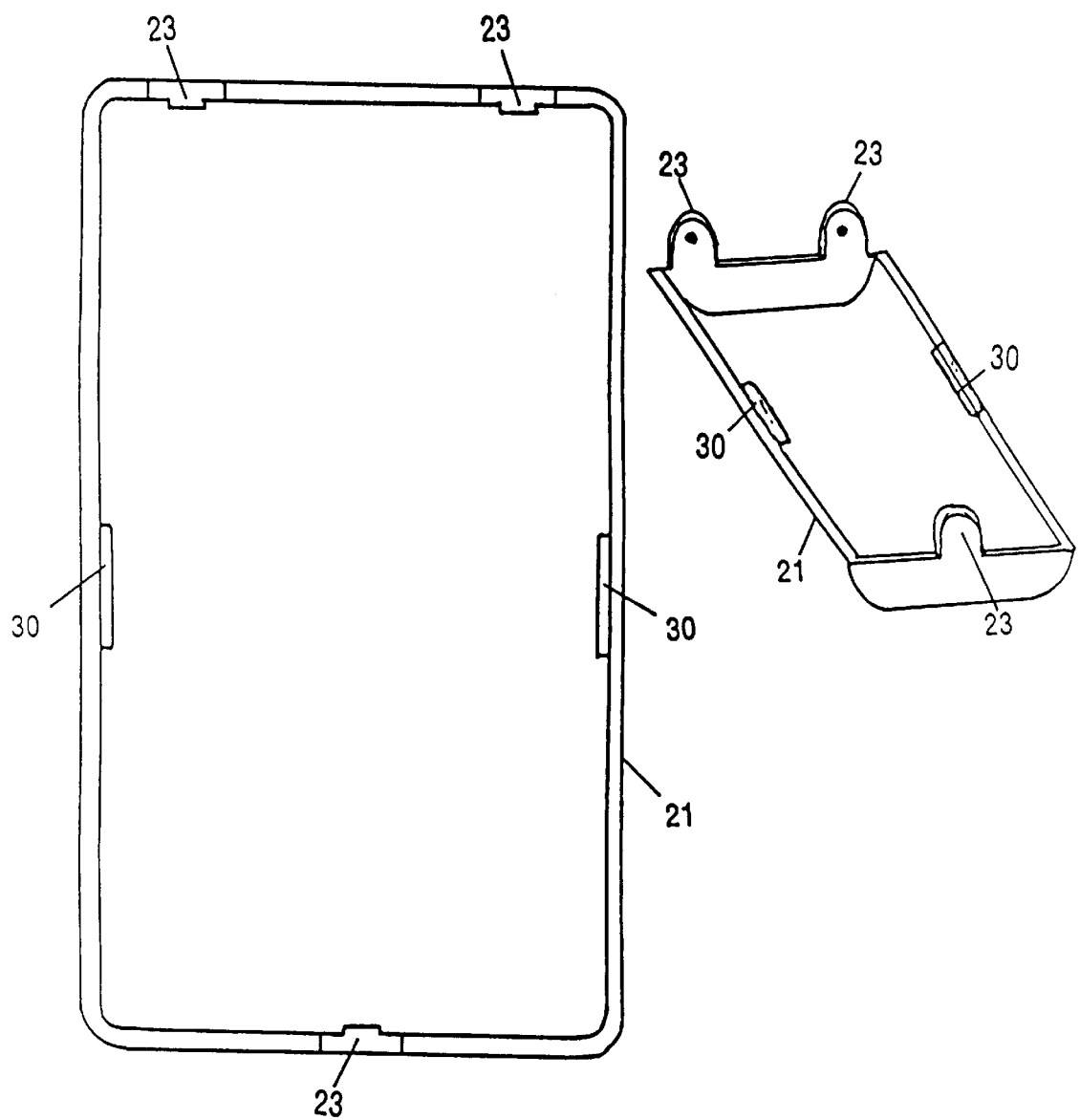
FIG. 3 shows the receptacle with its arms with projections and the locking bridge mechanism.
Figure 4:
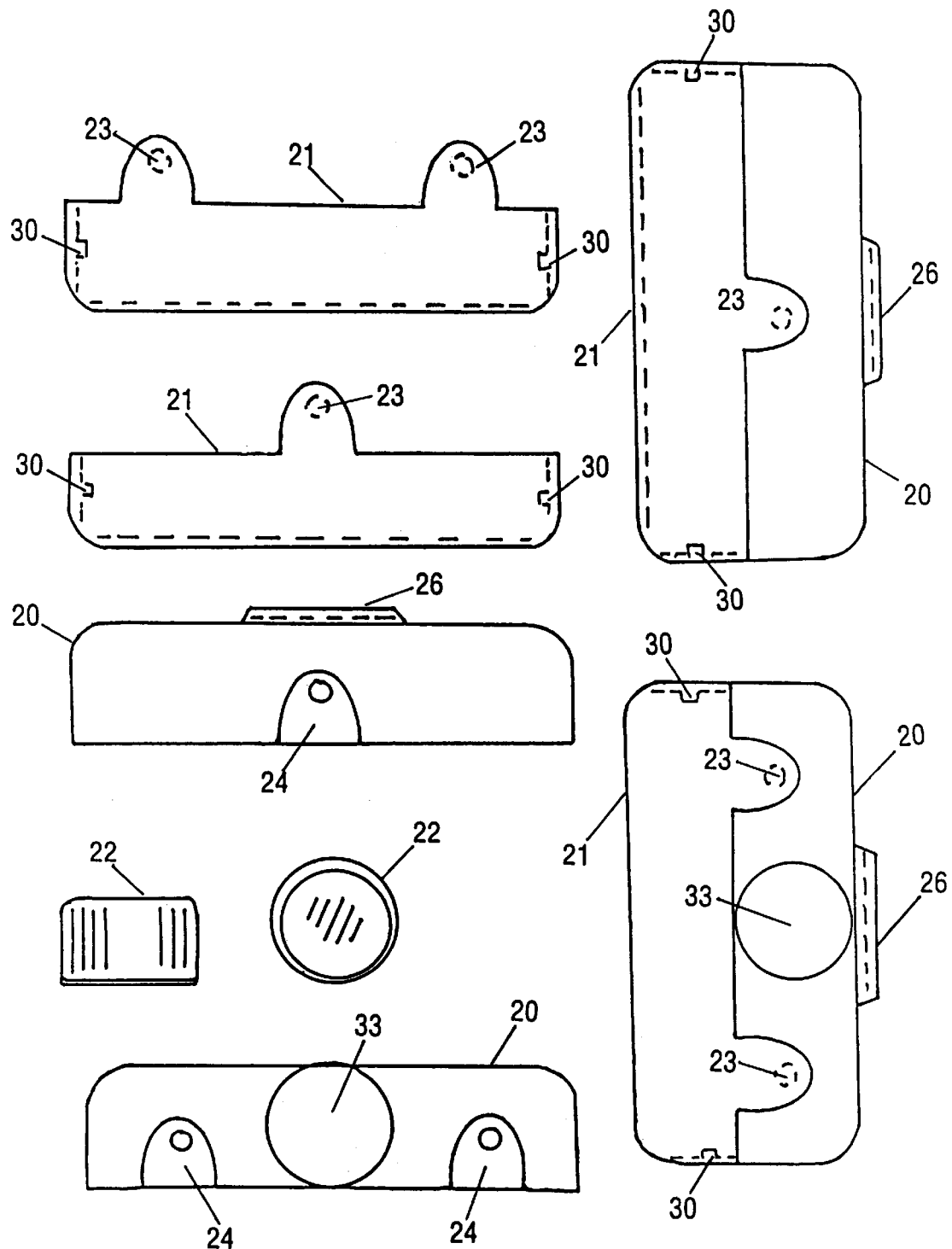
FIG. 4 shows the unit and shows the locking arms and the locking depressions with sockets.
Figure 5:
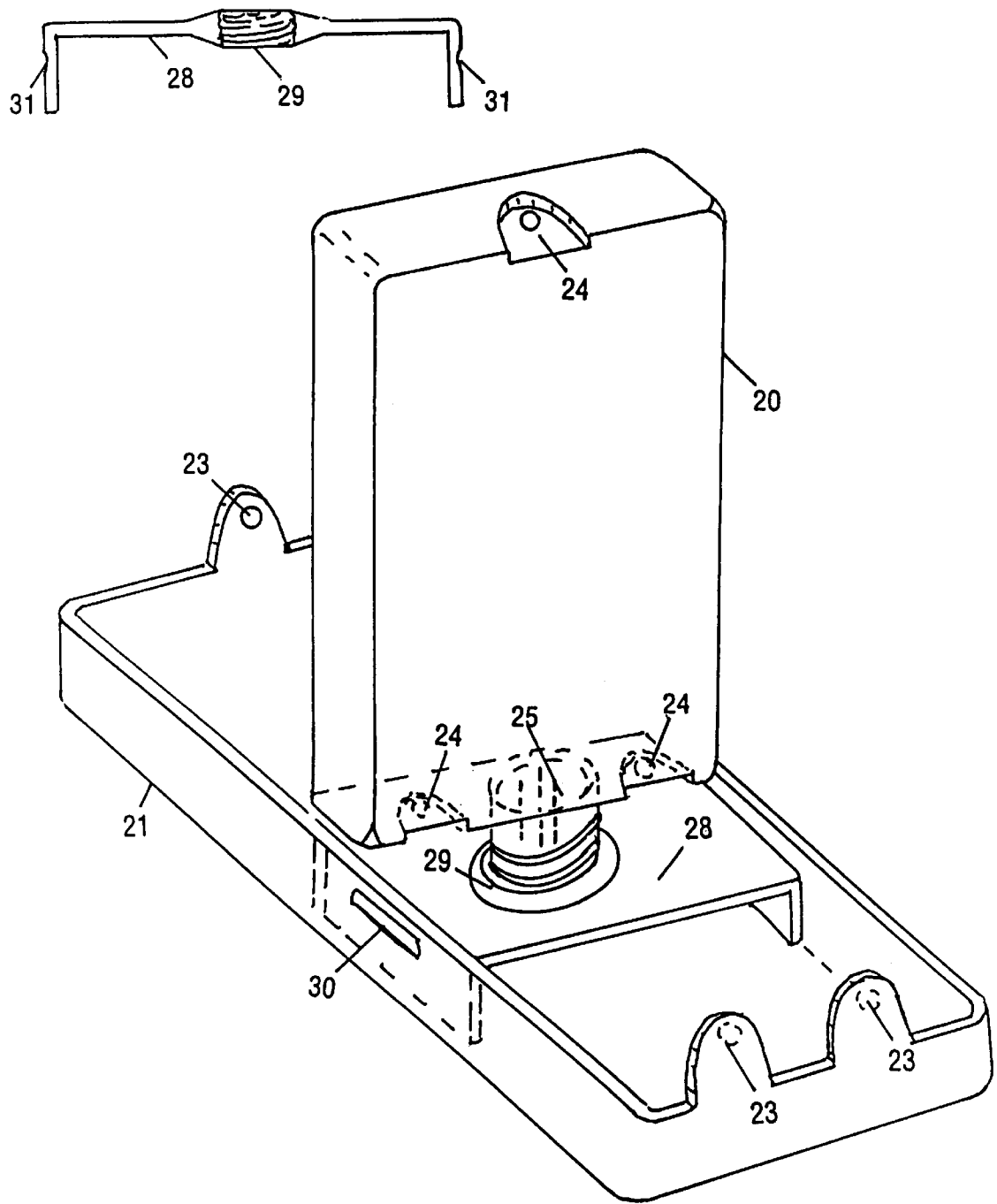
FIG. 5 shows the receptacle with its locking snap-in bridge bracket.
Figure 6:
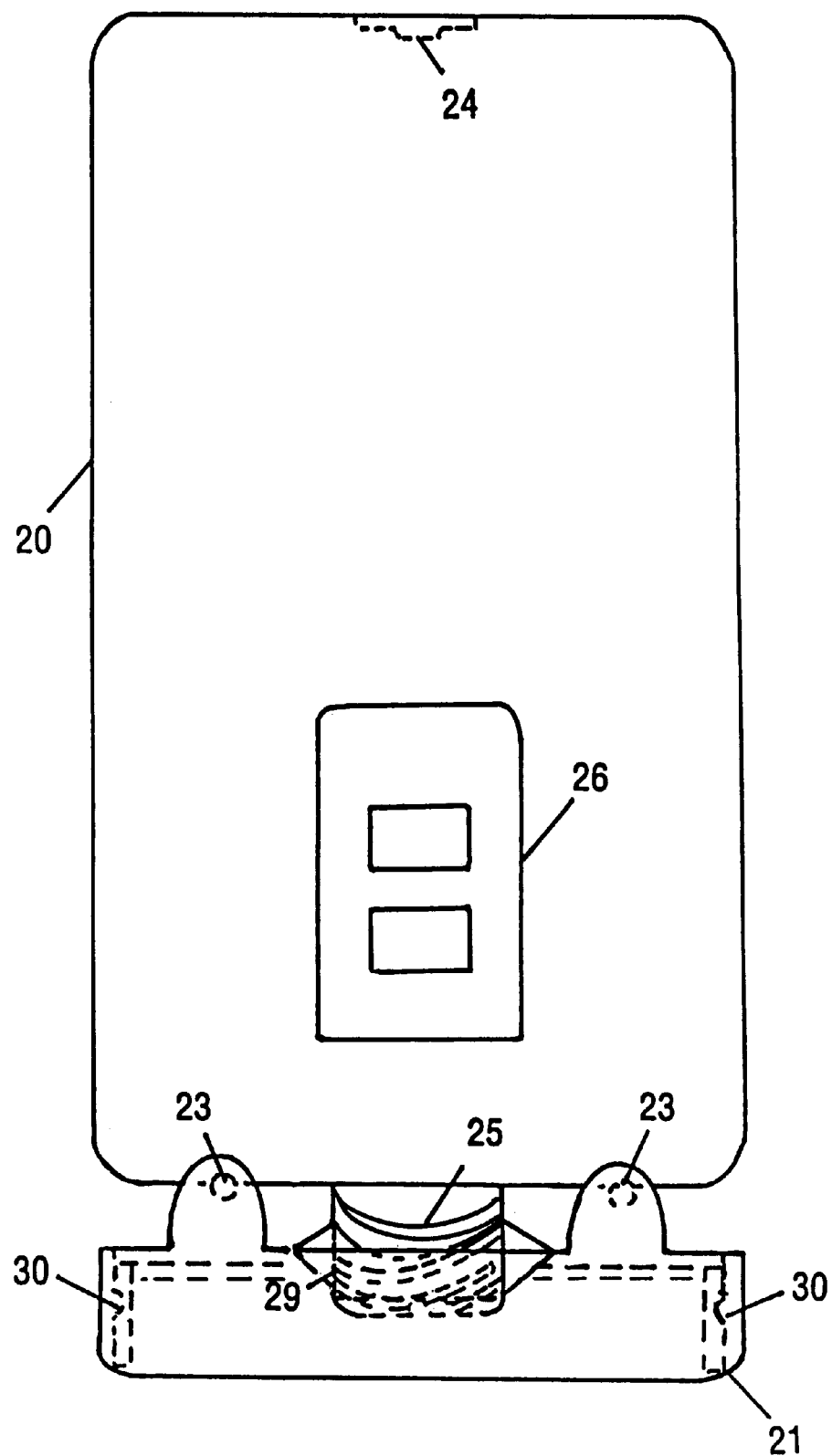
FIG. 6 shows the threading of the container onto the bracket.

20 Canteen
21 Dish
22 Cap
23 Locking arms and projections
24 Locking depressions and sockets
25 Canteen threaded neck
26 Belt clip
28 Snap-in bridge
29 Threaded hole
30 Locking slots for bridge
31 Locking protrusions on bridge
33 Canteen opening

SUMMARY

An object of this invention is to provide an improved portable watering utensil. Accordingly, objects and advantages of our invention include:

(a) A water carrying container and a receptacle;
(b) the water carrying container and the receptacle form a single compact unit;
(c) the single unit provides for hands free portability;
(d) the single unit may be securely and comfortably attached to the pet owner during transportation and outdoor activities;
(e) the single unit provides a spill-proof water container during transport or the most rigorous outdoor activities;
(f) the single unit is both easy and fast to use;
(g) the single unit transforms easily from its transportation mode to its in-use mode;
(h) the single unit transforms easily from its in-use mode to its transportation mode;
(i) the single unit may be used for pets of different types and different sizes;
(j) the single unit can simultaneously supply water both for the pet and the pet owner;
(l) the single unit can be used with a removable bridge to hold in place a water container containing extra water;
(m) the single unit is durable and reusable;
(n) the single unit which will never become obsolete.

DESCRIPTION—FIG(S) 1–6

The invention is a combination into a single compact and complete unit of a container and a receptacle. It includes a canteen-like container (20) which holds water and utilizes a screw-on cap (22), and a snap-on removable and replaceable receptacle (21). The container and receptacle (20 and 21) come apart and snap together, when in use and not, by use of modestly flexible arms with projections (23), which form a part of the receptacle (21), and which fit into depressions with sockets (24) in the container (20). For safe, secure and comfortable transportation of the unit, even during the most physical outdoor activities, the unit also has a belt-clip (26), affixed to the container portion of the unit by glue, epoxy, or other suitable fixative, and can be metal or plastic.

The unit includes a portable snap-in bridge-type bracket (28), which can be placed in the receptacle portion (21) of the unit during transportation and attaches to the receptacle (21) for use. The bracket (28) can be threaded to the container (20) and then inverted and snapped into place on the receptacle (21); the container (20) will put water in the receptacle (21) up to the level of the mouth (33) of the inverted container (20) as the water in the receptacle is consumed.

OPERATION—FIG(S) 1–6

The invention provides ease of transportation of a single unit with a spill-proof water container (20) and a receptacle (21). It provides comfortable and secure transportation of the unit to the pet owner and provides the ability to offer a pet needed nourishment during transportation or the most physical of activities.

The invention is spill-proof during transportation resulting from the canteen-like container (20) having a secure screw-on cap (22). The screw-on cap (22) is removed from the threaded neck (25) to access the water supply in the canteen (20) via the opening (33) and is replaced to again secure the remaining water. The invention's belt-clip (26), affixed to the canteen portion of the unit, comfortably secures the unit on the pet owner's belt during transportation and activities. This provides hands-free transportation of the unit during even rigorous activities.

The invention also includes a snap-on removable and replaceable receptacle (21) from which the pet can drink. The container and receptacle (20 and 21) are made so as to come apart and snap together when in use and not, respectively, by use of arms with projections (23), which form a part of the receptacle (21), which fit into depressions with sockets (24) in the container (20). To separate the container (20) from the receptacle (21), the arms need only be lifted sufficiently to clear the projections on the arms from the sockets, and the receptacle is removed and put in place for the pet. To reattach, the projections (23) on the receptacle (21) are aligned with the depressions with sockets (24) on the container (20) and the receptacle and container are pushed together.

The receptacle (21) is placed on the ground or other acceptable surface when being used to furnish nourishment to the pet. The pet owner can drink directly from the container (20) at the same time the pet is receiving water via the receptacle (21).

For a larger water supply, or while leaving a pet in place for a period of time, the invention includes a portable snap-in bridge-type bracket (28). The bracket (28) can be placed in the receptacle portion (21) of the unit during transportation. The bracket is utilized by threading (29) the bracket (28) on to the neck (25) of the container (20) and then inverting and snapping the bracket in place on the receptacle (20). Water will not overflow the receptacle (21) when so installed as the container (20) will only put water in the receptacle (21) up to the level of the mouth (33) of the snapped-in-place inverted container (20) as the water in the receptacle is consumed.

CONCLUSION, RAMIFICATIONS AND SCOPE

The reader will see that the single unit canteen-like container and receptacle can be easily and comfortably transported. In addition, the unit can be transported hands free, allowing the pet owner to engage in physical activities without impediment by the unit. It provides, at once, a compact unit for transportation along with all of the elements required to furnish nourishment to the pet, and the pet owner along with the pet.

While the above-stated description contains many specificities, these should not be construed as limitations on the scope of the invention, but rather as an exemplification of one preferred embodiment thereof. Many other variations are possible. For example, the container and receptacle could be of different shapes, or the receptacle could be divided into sections to permit both watering and feeding simultaneously, and the secure transportation of food in the dish or the portion utilized for food. Affixing the receptacle to the container could be accomplished by a different method, such as putting the projections in the depressions on the container and a socket on the receptacle's arms, or rigid matching tongue and grove method on the sides of the container and the receptacle. Similarly, securely and comfortably affixing the unit to the pet owner during transportation and activities could employ a different method; for example, by providing rigid loops on the container sufficient to allow a belt to pass through and around the waist of the pet owner; this method, if it incorporates loops on the container, could also provide another different way of combining the container and receptacle.

The scope of the invention should be determined by the claims and their legal equivalents, not by the embodiments illustrated.

We claim:

1. A portable animal watering and feeding assembly appearing as a single unit and comprising:

(a) a container which first provides a water-tight means of sealing liquid within the container, and secondly provides an easily accessible method of removing the liquid from the container;

(b) a receptacle which can be attached to the container to make a single, compact unit, and which can be separated from the container to allow nutrient(s) to be deposited;

(c) a means of affixing the receptacle and the container in combination, wherein the receptacle has built into its sides arms with projections which fit into depressions with sockets in the container and smoothly lock the container and receptacle together into a single unit; and (d) a device to permit hands-free transportation of the combined container and receptacle.

* * * * *